US007713438B2

(12) United States Patent
Takaku

(10) Patent No.: US 7,713,438 B2
(45) Date of Patent: May 11, 2010

(54) LIQUID CRYSTAL COMPOSITION, LIQUID CRYSTAL DEVICE, REFLECTIVE DISPLAY MATERIAL, AND LIGHT MODULATING MATERIAL

(75) Inventor: Koji Takaku, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 27 days.

(21) Appl. No.: 12/028,640

(22) Filed: Feb. 8, 2008

(65) Prior Publication Data

US 2008/0286497 A1 Nov. 20, 2008

(30) Foreign Application Priority Data

Feb. 20, 2007 (JP) ............................ 2007-039293

(51) Int. Cl.
*C09K 19/00* (2006.01)
*C09K 19/06* (2006.01)
*C09K 19/52* (2006.01)

(52) U.S. Cl. ............................ 252/299.01; 252/299.6; 252/299.7; 430/20; 428/1.1; 349/184; 349/185; 349/186

(58) Field of Classification Search ............ 252/299.01, 252/299.6, 299.7; 430/20; 428/1.1; 349/184–186
See application file for complete search history.

(56) References Cited

U.S. PATENT DOCUMENTS 6,787,201 B2 * 9/2004 Hisamitsu et al. ............ 428/1.3

OTHER PUBLICATIONS

Goodby et al., "A new Molecular Ordering in Helical Liquid Crystals," J. Am. Chem. Soc., vol. III, 1989, pp. 8119-8125.

Kramarenko et al., "Twist grain boundary states in non-chiral smectogen-chiral dopant," Liquid Crystals, , vol. 22, No. 5, 1997, pp. 535-541.

* cited by examiner

*Primary Examiner*—Geraldina Visconti
(74) *Attorney, Agent, or Firm*—Birch, Stewart, Kolasch & Birch, LLP

(57) ABSTRACT

At least one cholesteric liquid crystal composition is mixed with at least one first nematic liquid crystal compound or composition, thereby exhibiting a TGBA phase at room temperature. The first nematic liquid crystal compound or composition preferably includes a compound having a cyano group, a halogen atom, a nitro group, a perfluoroalkoxy group or a perfluoroalkyl group at the terminal thereof. The cholesteric liquid crystal composition preferably contains a second nematic liquid crystal compound or composition and a chiral reagent.

17 Claims, No Drawings

LIQUID CRYSTAL COMPOSITION, LIQUID CRYSTAL DEVICE, REFLECTIVE DISPLAY MATERIAL, AND LIGHT MODULATING MATERIAL

CROSS REFERENCE TO RELATED APPLICATIONS

This application claims priority under 35USC 119 from Japanese Patent Application No. 2007-039293, the disclosure of which is incorporated herein by reference.

BACKGROUND OF THE INVENTION

1. Field of the Invention

The present invention relates to a liquid crystal composition, a liquid crystal device, a reflective display material and a light modulating material, and particularly to a liquid crystal composition, a liquid crystal device, a reflective display material and a light modulating material suitably utilized in a light scattering system and a guest-host system.

2. Description of the Related Art

A cholesteric liquid crystal is used in, for example, a White-Taylor display system in which display performance is improved by reducing light leakage with a display material utilizing selective reflection derived from a periodic helical structure, or with a guest-host display mode containing a dichroic dye. The cholesteric liquid crystal is characterized by having a memory function in a planar state and a focal-conic state in a liquid crystal device. Because of the degree of order derived from a nematic liquid crystal and the continuity of a liquid crystal layer, however, the cholesteric liquid crystal does not have a memory function in a homeotropic state and the degree of light scattering is reduced.

On the other hand, a smectic phase is a liquid crystal layer of low continuity having a higher degree of order than that of a nematic phase. There are expectations that a smectic phase, a TGBA (twisted grain boundary SmA) phase with a liquid crystal layer formed in a helical structure might be a phase capable of solving the above problem. TGBA phases disclosed so far are phases exhibited in a high temperature range and in a narrow temperature range, as disclosed in, for example, J. Am. Chem. Soc., 111, 8119 (1989) and Liquid Crystals, Vol. 22, No. 5, 535-541 (1997), and TGBA phases that are expressed at room temperature are hardly known.

SUMMARY OF THE INVENTION

A first aspect of the invention is to provide a liquid crystal composition exhibiting a Twisted Grain Boundary Smectic A (TGBA) phase at room temperature, comprising at least one cholesteric liquid crystal composition and at least one first nematic liquid crystal compound or composition.

A second aspect of the invention is to provide a liquid crystal device having a pair of electrodes of which at least one is a transparent electrode, and a liquid crystal layer between the pair of the electrodes, wherein the liquid crystal layer contains at least one liquid crystal composition according to the first aspect of the invention.

A third aspect of the invention is to provide a reflective display material having the liquid crystal device according to the second aspect of the invention.

A fourth aspect of the invention is to provide a light modulating material having the liquid crystal device according to the second aspect of the invention.

DETAILED DESCRIPTION OF THE MENTION

The present invention will be described in detail below. In the present specification " . . . to . . . " represents a range including the numeral values represented before and after "to" as a minimum value and a maximum value, respectively.

Conventionally reported TGBA phases are exhibited only at high temperature and in a narrow temperature range. Only TGBA phases of very limited molecular structures are exhibited at room temperature, and are exhibited in a very narrow temperature range only, and thus such TGBA phases have poor versatility.

Accordingly, the present inventors made extensive investigations, and as a result, they found that when a specific cholesteric liquid crystal composition, preferably a liquid crystal composition which is nonpolar or weakly polar, contains a nematic liquid crystal compound, which has an ester group, an azomethine group or an azoxy group as a group for linking a liquid crystal core, and which exhibits a cholesteric phase at room temperature, is combined with a specific nematic liquid crystal compound or composition preferably having a cyano group, a halogen atom, a nitro group, a perfluoroalkoxy group or a perfluoroalkyl group at a terminal thereof, the resulting liquid crystal shows a TGBA phase at room temperature and in a broad temperature range, and on the basis of this finding, the present invention was thereby completed.

Hereinafter, the liquid crystal composition showing a TGBA phase at room temperature in the present invention is referred to sometimes as "TGBA-phase liquid crystal composition".

In the present invention, the term nematic liquid crystal compound refers to a compound exhibiting a nematic phase at 25° C. (room temperature), or with rising temperature, and the nematic liquid crystal composition refers to a composition exhibiting a nematic phase at 25° C. (room temperature). The term cholesteric liquid crystal composition refers to a composition exhibiting a cholesteric phase at 25° C. (room temperature).

<First Nematic Liquid Crystal Compound or Composition>

The nematic liquid crystal compound to be mixed with a specific cholesteric liquid crystal composition thereby inducing a TUBA phase is referred to in the present invention as "the first nematic liquid crystal compound" and the nematic liquid crystal composition to be mixed with a specific cholesteric liquid crystal composition thereby inducing a TGBA phase is referred to in the present invention as "nematic liquid crystal composition".

The first nematic liquid crystal compound or nematic liquid crystal composition includes a liquid crystal compound having a cyano group, a halogen atom, a nitro group, a perfluoroalkoxy group or a perfluoroalkyl group at the terminal thereof or a liquid crystal composition containing the liquid crystal compound.

The skeleton of the first nematic liquid crystal compound is not particularly limited insofar as it has liquid crystallinity and has the above substituent at the terminal thereof but from the viewpoint of enhancing an ability to induce smectic liquid crystallinity, the first nematic liquid crystal compound is preferably a compound represented by the following Formula (I):

$$T^1\text{-}((D^1)_e\text{-}(L^1)_f)_m\text{-}(D^2)_k\text{-}T^2 \qquad \text{Formula (I)}$$

In Formula (I), $D^1$ and $D^2$ each independently represent an arylene group, a heteroarylene group or a divalent alicyclic hydrocarbon group; $L^1$ represents a divalent linking group; $T^1$ represents an alkyl group or an alkoxy group; $T^2$ represents a cyano group, a halogen atom, a nitro group, a perfluoroalkoxy group or a perfluoroalkyl group; e is an integer of 1 to 3; m is an integer of from 1 to 3; k is 1 or 2; and f is an integer of from 0 to 3.

The arylene group represented by each of $D^1$ and $D^2$ is preferably an arylene group having 6 to 20 carbon atoms, more preferably 6 to 10 carbon atoms. Preferred examples of the arylene group include a phenylene group and a naphthalene group such as a 1,4-phenylene group, a naphthalene-2,6-diyl group, and a tetrahydronaphthalene-2,6-diyl group.

The heteroarylene group represented by each of $D^1$ and $D^2$ is preferably a heteroarylene group having 1 to 20 carbon atoms, and more preferably 2 to 9 carbon atoms. Specific examples of the heteroarylene group include a group having a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring or a triazole ring, and a heteroarylene group which is obtained by subtracting one hydrogen atom from each of hydrogen atoms bonded to two carbon atoms of a condensed ring formed by condensing the above rings.

The divalent alicyclic hydrocarbon group represented by each of $D^1$ and $D^2$ is preferably a divalent alicyclic hydrocarbon group having 3 to 20 carbon atoms, and more preferably 4 to 12 carbon atoms. Specific examples of preferred divalent alicyclic hydrocarbon groups include a cyclohexadiyl group and a decahydronapthalenediyl group, more preferably cyclohexane-1,4-diyl group and a decahydronaphthalene-2,6-diyl group.

The divalent arylene group, divalent heteroarylene group, or divalent alicyclic hydrocarbon group represented by each of $D^1$ and $D^2$ may have a substituent or may be unsubstituted. When e, m or k in the Formula (I) is 2 or more, the plural $D^1$ or $D^2$ may each independently may have a substituent or may be unsubstituted, and may have the same or different substituents.

The substituents include the following substituent group V.

(Substituent Group V)

Halogen atoms (for example, chlorine, bromine, iodine, fluorine), the mercapto group, a cyano group, a carboxyl group, a phosphoric group, a sulfo group, a hydroxy group, a carbamoyl group having 1 to 10 carbon atoms, preferably 2 to 8 carbon atoms, and more preferably 2 to 5 carbon atoms (for example, methyl carbamoyl, ethyl carbamoyl, morpholinocarbamoyl), a sulfamoyl group having 0 to 10 carbon atoms, preferably 2 to 8 carbon atoms, and more preferably 2 to 5 carbon atoms (for example, methylsulfamoyl, ethylsulfamoyl, piperidinosulfamoyl), a nitro group, an alkoxy group having 1 to 20 carbon atoms, preferably 1 to 10 carbon atoms, and more preferably 1 to 8 carbon atoms (for example, methoxy, ethoxy, 2-methoxyethoxy, 2-phenylethoxy), an aryloxy group having 6 to 20 carbon atoms, preferably 6 to 12 carbon atoms, and more preferably 6 to 10 carbon atoms (for example, phenoxy, p-methylphenoxy, p-chlorophenoxy, naphthoxy), an acyl group having 1 to 20 carbon atoms, preferably 2 to 12 carbon atoms, and more preferably 2 to 8 carbon atoms (for example, acethy, benzoyl, trichloroacetyl), an acyloxy group having 1 to 20 carbon atoms, preferably having 2 to 12 carbon atoms, and more preferably 2 to 8 carbon atoms (for example, acetyloxy, benzoyloxy), an acylamino group having 1 to 20 carbon atoms, preferably having 2 to 12 carbon atoms, and more preferably 2 to 8 carbon atoms (for example, acetylamino), a sulfonyl group having 1 to 20 carbon atoms, preferably 1 to 10, and more preferably 1 to 8 carbon atoms (for example, methanesulfonyl, ethanesulfonyl, benzenesulfonyl), a sulfinyl groups having 1 to 20 carbon atoms, preferably 1 to 10, and more preferably 1 to 8 carbon atoms (for example, methanesulfinyl, ethanesulfinyl, benzenesulfinyl), a substituted or unsubstituted amino group having 1 to 20 carbon atoms, preferably 1 to 12 carbon atoms, and more preferably 1 to 8 carbon atoms (for example, amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphnylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino, N,N-methylphenylamino, N,N-ethylphenylamino), an ammonium group having 0 to 15 carbon atoms, preferably 3 to 10 carbon atoms, more preferably 3 to 6 carbon atoms (for example, trimethylammonium, triethylammonium), a hydrazino group having 0 to 15 carbon atoms, preferably 1 to 10 carbon atoms, and more preferably 1 to 6 carbon atoms (for example, trimethylhydrazino), an ureido group having 1 to 15 carbon atoms, preferably 1 to 10 carbon atoms, and more preferably 1 to 6 carbon atoms (for example, ureido group, N,N-dimethylureido group), an imido group having 1 to 15 carbon atoms, preferably 1 to 10 carbon atoms, and more preferably 1 to 6 carbon atoms (for example, succinimide group), an alkylthio group having 1 to 20 carbon atoms, preferably 1 to 12 carbon atoms, and more preferably 1 to 8 carbon atoms (for example, methylthio, ethylthio, propylthio), an arylthio group having 6 to 80 carbon atoms, preferably 6 to 40 carbon atoms, and more preferably 6 to 30 carbon atoms (for example, phenylthio, p-methylphenylthio, p-chlorophenylthio, 2-pyridylthio, 1-naphthylthio, 2-naphthylthio, 4-propylcyclohexyl-4'-biphenylthio, 4-butylcyclohexyl-4'-biphenylthio, 4-pentyleyelohexyl-4'-biphenylthio, 4-propylphenyl-2-ethynyl-4'-biphenylthio), a heteroarylthio group having 1 to 80 carbon atoms, preferably 1 to 40 carbon atoms, and more preferably 1 to 30 carbon atoms (for example, 2-pyridylthio, 3-pyridylthio, 4-pyridylthio, 2-quinolylthio, 2-furilthio, 2-pyrrolylthio), an alkoxycarbonyl groups having 2 to 20 carbon atoms, preferably 2 to 12 carbon atoms, and more preferably 2 to 8 carbon atoms (for example, methoxycarbonyl, ethoxycarbonyl, 2-benzyloxycarbonyl), an aryloxycarbonyl group having 6 to 20 carbon atoms, preferably 6 to 12 carbon atoms, and more preferably 6 to 10 carbon atoms (for example, phenoxycarbonyl), an unsubstituted alkyl group having 1 to 18 carbon atoms, preferably 1 to 10 carbon atoms, and more preferably 1 to 5 carbon atoms (for example, methyl ethyl, propyl, butyl), a substituted alkyl group having 1 to 18 carbon atoms, preferably 1 to 10 carbon atoms, and more preferably 1 to 5 carbon atoms {for example, hydroxymethyl, trifluoromethyl, benzyl, carboxyethyl, ethoxycarbonylmethyl, acetylaminomethyl, moreover, in here, an unsaturated hydrocarbon group having 2 to 18 carbon atoms, preferably 3 to 10 carbon atoms, and more preferably 3 to 5 carbon atoms (for example, a vinyl group, an ethynyl group, an 1-cyclohexenyl group, a benzylidyne group, a benzylidene group) will be included in the substituted alkyl groups}, a substituted or unsubstituted aryl group having 6 to 20 carbon atoms, preferably 6 to 15 carbon atoms, and more preferably 6 to 10 carbon atoms (for example, phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcycloliexyl-4'-biphenyl, 4-pentylcyclohexyl-4'-biphenyl, 4-propylphenyl-2-ethynyl-4'-biphenyl), a substituted or unsubstituted heteroaryl group having 1 to 20 carbon atoms, preferably 2 to 10 carbon atoms, and more preferably 4 to 6 carbon atoms (for example, pyridyl, 5-methylpyridyl, thienyl, furyl, morpholino, tetrahydrofurfuryl).

Those substituent groups V may have a structure in which a benzene ring or a naphthalene ring is condensed. Further, the substituent illustrated by the explanation for V explained so far may further be substituted on the substituents described above.

In the substituent group V, preferable substituents on the divalent arylene group, divalent heteroarylene group, and divalent alicyclic hydrocarbon group represented by each of $D^1$ and $D^2$ include an alkyl group, an alkoxy group, a halogen atom, a cyano group and a nitro group.

Particularly, $D^2$ bound to the terminal group $T^2$ representing a cyano group, a halogen atom, a nitro group, a perfluoroalkoxy group or a perfluoroalkyl group is preferably substituted with an electron-withdrawing group such as a halogen atom or a cyano group, from the viewpoint of enhancing an ability to induce smectic liquid crystallinity, and the position of such an electron-withdrawing group substituted as a substituent on $D^2$ is preferably the ortho-position relative to $T^2$.

In the Formula (I), $L^1$ represents a divalent linking group. $L^1$ is preferably an alkanediyl group, an alkenylene group, an alkynylene group, an ether group, an ester group (—COO— or —OCO—), a carbonyl group, an azomethine group (—C═N—, —N═C—), an azo group, an azoxy group or an alkyleneoxy group, and more preferably an ester group or an azoinethine group.

In the Formula (I), $T^1$ represents an alkyl group or an alkoxy group. $T^1$ is preferably: an alkyl group having preferably 1 to 30 carbon atoms, more preferably 3 to 20 carbon atoms, and even more preferably 3 to 10 carbon atoms (for example, an n-propyl group, an n-butyl group, an n-pentyl group, an n-hexyl group, an n-nonyl group etc.); or an alkoxy group having preferably 1 to 30 carbon atoms, more preferably 3 to 20 carbon atoms, and even more preferably 3 to 10 carbon atoms (for example, an n-propyloxy group, an n-butyloxy group, an n-pentyloxy group, an n-hexyloxy group, an n-octyloxy group etc.).

The substituent represented by $T^1$ in the Formula (I) may or may not have a substituent, and such substituent includes the substituent group V.

In the Formula (I), $T^2$ represents a cyano group, a halogen atom, a nitro group, a perfluoroalkoxy group or a perfluoroalkyl group, $T^2$ is preferably: a perfluoroalkoxy group having preferably 1 to 10 carbon atoms, and more preferably 1 to 6 carbon atoms (for example, a trifluoromethoxy group, a nonafluorobutoxy group); a perfluoroalkyl group having preferably 1 to 10 carbon atoms, and more preferably 1 to 6 carbon atoms (for example, a trifluoromethyl group, a nonafluorobutyl group); a halogen atom (for example, a fluorine atom, a chlorine atom); a nitro group; or a cyano group.

The substituent represented by $T^2$ in the Formula (I) may or may not have a substituent, and such substituent includes the substituent group V.

In the Formula (I), e is an integer of from 1 to 3, and preferably 1 or 2. When e is 2 or 3, the plural $D^1$ may be the same or different.

In the Formula (I), m is an integer of from 1 to 3, and preferably 1 or 2. When m is 2 or 3, the plural $D^1$ may be the same or different, and the plural $L^1$ may be the same or different.

In the Formula (I), k is 1 or 2. When k is 2, the plural $D^2$ may be the same or different.

In the Formula (I), f is an integer of from 0 to 3, preferably from 0 to 2. When f is 2 or 3, the plural $L^1$ represent linking groups different from each other.

The total number of groups represented by $D^1$ and $D^2$ in the Formula (I), that is, e×m+k, is preferably an integer of from 2 to 5, more preferably an integer of from 2 to 4, and even more preferably an integer of 2 or 3. When each of e and k is 2 or more, two or more $D^1$ and $D^2$ may be respectively the same or different, and when f is 2 or more, two or more $L^1$ may be the same or different, and when m is 2 or more, two or more $((D^1)_e(L^1)_f)$ may be respectively the same or different.

Particularly preferable combinations of e, f, m and k are as follows:

e=1, f=1, m=2, k=1 (i)

e=2, f=1, m=1, k=1 (ii)

e=2, f=2, m=1, k=1 (iii)

e=1, f=1, m=1, k=2 (iv)

e=1, f=2, m=1, k=2 (v)

e=1, f=1, m=1, k=1 (vi)

e=1, f=0, m=2, k=1 (vii)

e=1, f=0, m=1, k=1 (viii)

Specific examples of the first nematic liquid crystal compound are shown below, but the present invention is not limited thereto.

(1)

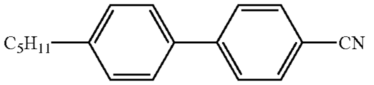

(2)

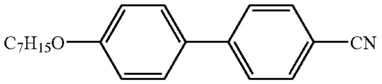

(3)

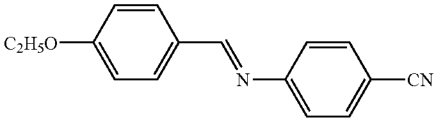

(4)

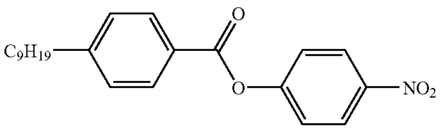

(5)

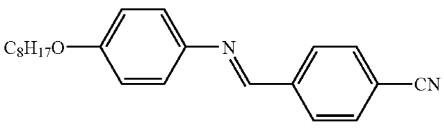

(6)

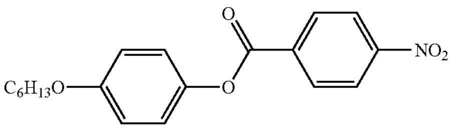

(7)

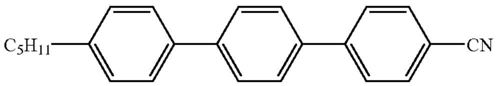

-continued (8)

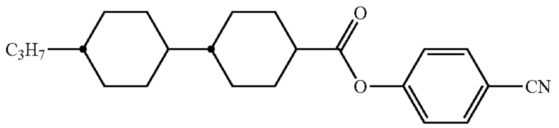

(9)

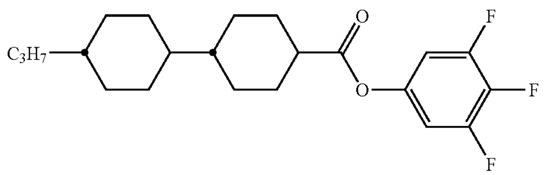

(10)

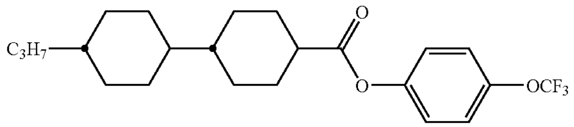

(11)

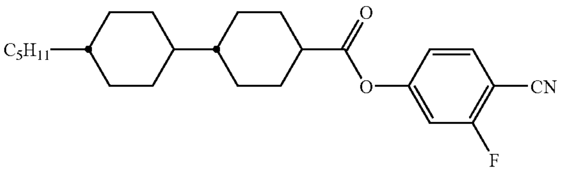

(12)

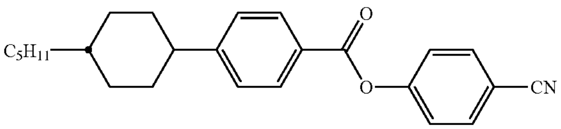

(13)

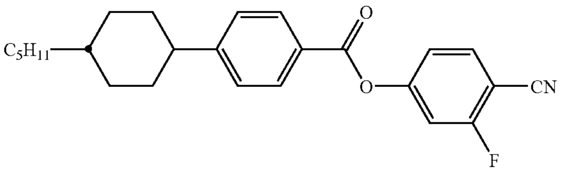

(14)

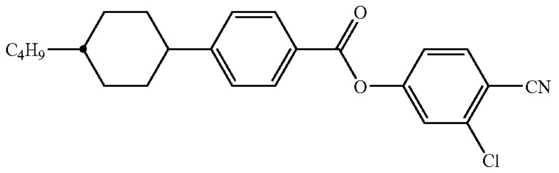

(15)

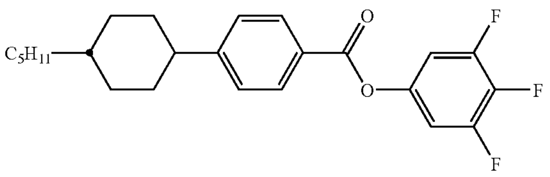

(16)

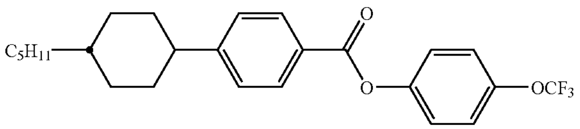

-continued (17)

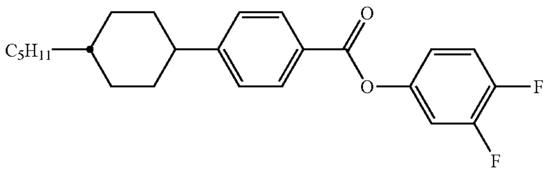

Depending on the object, the first nematic liquid crystal composition may be mixed with plural kinds of compounds other than the first nematic liquid crystal compound.

<Cholesteric Liquid Crystal Composition>

The cholesteric liquid crystal composition in the present invention is not particularly limited insofar as it exhibits a cholesteric phase at room temperature (25° C.), but the cholesteric liquid crystal composition is preferably a composition being nonpolar or weakly polar and having an ester linking group or an azoxy group. The cholesteric liquid crystal composition preferably contains at least one second nematic liquid crystal compound or composition and at least one chiral reagent.

The mechanism of exhibition of TGBA phase at room temperature is speculated as follows: When the cholesteric liquid crystal composition is used, a weak donor-acceptor interaction occurs between the cholesteric liquid crystal composition and the first nematic liquid crystal compound or composition having a specific terminal group, thereby stabilizing the layer structure and exhibiting a smectic phase. When the cholesteric liquid crystal composition containing a chiral reagent and the second nematic liquid crystal compound is used, a twisting power is generated due to the effect of the chiral reagent, so a TGBA phase is easily exhibited at room temperature. However, the present invention is not limited by such speculation.

—Chiral Agent—

The chiral reagent added to the cholesteric liquid crystal composition may include, for example, chiral reagents for TN and STN described in Liquid Crystal Device Handbook, pp. 199-202, edited by Committee 142 of Japan Society for the Promotion of Science and published by Nikkan Kogyo Shimbun (1989). Preferable chiral reagents are those having high HTP (helical twisting power) indicative of twisting power are preferable where the HTP is preferably from 1 to 100, more preferably from 3 to 50, and even more preferably from 5 to 50.

—Second Nematic Liquid Crystal Compound or Composition—

The second nematic liquid crystal compound is preferably a liquid crystal compound having, in its molecule, an ester linkage, an azomethine group or an azoxy group, and the second nematic liquid crystal composition is preferably a composition containing the liquid crystal compound. The second nematic liquid crystal compound or composition exhibits a nematic phase at room temperature.

The skeleton of the second nematic liquid crystal compound is not particularly limited, but preferably has an ester group (—COO—, —OCO—), an azomethine group (—N═C—, —C═N—) or an azoxy group and having liquid crystallinity. When the compound of the Formula (I) is used as the first nematic liquid crystal compound, a compound represented by Formula (II) below is preferably used as the second nematic liquid crystal compound.

$$T^1\text{-}((D^1)_e(L^2)_f)_m\text{-}(D^2)_k\text{-}T^3 \qquad \text{Formula (II)}$$

In Formula (II), $T^1$, $D^1$, $D^2$, e, m, k and f have the same meaning as $T^1$, $D^1$, $D^2$, e, m, k and f in the Formula (I), respectively.

In Formula (II), $T^3$ represents an alkyl group, an alkoxy group or a halogen atom. $T^3$ is preferably: an alkyl group having preferably 1 to 30 carbon atoms, more preferably 3 to 20 carbon atoms, and even more preferably 3 to 10 carbon atoms (for example, an n-propyl group, an n-butyl group, an n-pentyl group, an n-hexyl group, an n-nonyl group or the like); an alkoxy group having preferably 1 to 30 carbon atoms, more preferably 3 to 20 carbon atoms, and even more preferably 3 to 10 carbon atoms (for example, an n-propyloxy group, an n-butyloxy group, an n-pentyloxy group, an n-hexyloxy group, an n-octyloxy group or the like); or a fluorine atom.

When $T^3$ of Formula (II) is a halogen atom, $T^2$ of Formula (I) is not a halogen atom. When $T^2$ of Formula (I) is a halogen atom, $T^3$ of Formula (II) is not a halogen atom.

The substituent represented by each of $T^1$ and $T^3$ in the Formula (II) may or may not have a substituent, and such substituent includes the substituent group V above.

In Formula (II), $L^2$ represents a divalent linking group. $L^2$ is preferably an alkanediyl group, an alkenylene group, an alkynylene group, an ether group, an ester group (—COO—, —OCO—), a carbonyl group, an azomethine group (—C═N—, —N═C—), an azo group, an azoxy group or an alkyleneoxy group, and more preferably an ester group, an azomethine group or an azoxy group.

Specific examples of the second nematic liquid crystal compound are shown below, but the present invention is not limited thereto.

(18)

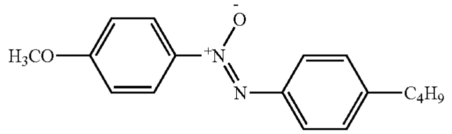

(19)

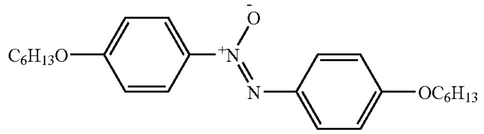

(20)

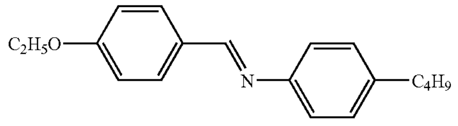

(21)

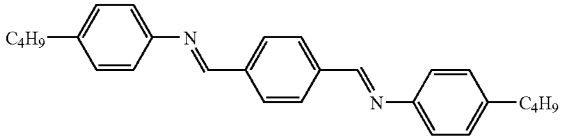

-continued (22)

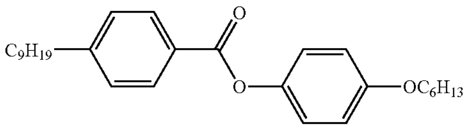

(23)

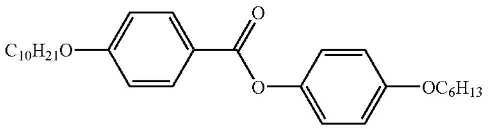

(24)

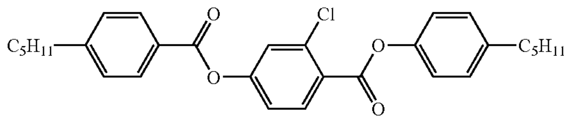

(25)

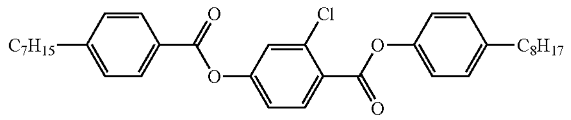

(26)

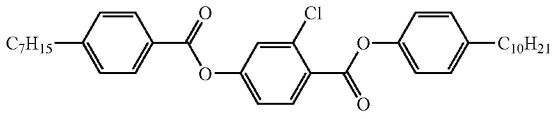

(27)

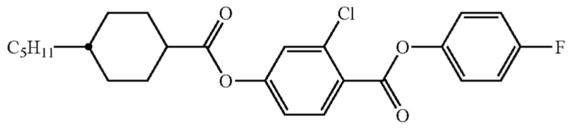

(28)

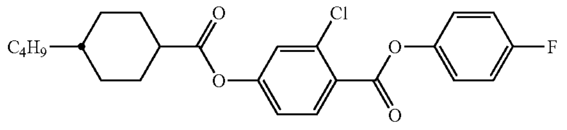

(29)

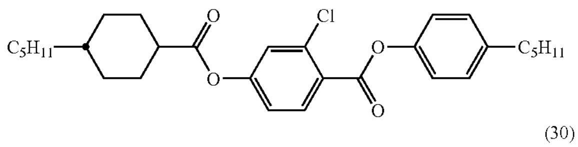

(30)

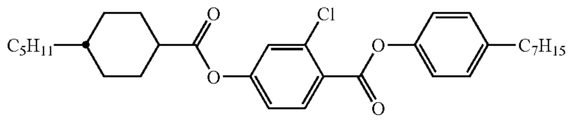

—Cholesteric Liquid Crystal Composition—

In the cholesteric liquid crystal composition of the present invention, the ratio of the second nematic liquid crystal compound or composition to the chiral reagent may be any ratio insofar as the liquid crystal composition obtained by mixing them exhibits a cholesteric phase at room temperature, but the ratio (A:B) of the second nematic liquid crystal compound or composition (A) to the chiral reagent (B) is preferably in the range of from 80 mol %20 mol % to 99.9 mol %:0.1 mol %, more preferably 85 mol %:15 mol % to 99.5 mol %:0.5 mol %, and even more preferably 90 mol %:10 mol % to 99 mol %:1 mol %.

Whether the cholesteric liquid crystal composition exhibits a cholesteric phase at 25° C. (room temperature) or not may be confirmed by observation of the liquid crystal phase under a polarization microscope.

If necessary, plural compounds other than the second nematic liquid crystal compound and the chiral reagent may be mixed in the cholesteric liquid crystal composition in the present invention, depending on the object (for example, the object of regulating the liquid crystal temperature range).

<TGBA-Phase Liquid Crystal Composition>

In the TGBA-phase liquid crystal composition of the present invention, the ratio of the cholesteric liquid crystal composition to the first nematic liquid crystal compound or composition may be any ratio insofar as the liquid crystal composition obtained by mixing them exhibits a TGBA phase at room temperature, but the ratio (C:D) of the cholesteric liquid crystal composition (C) to the first nematic liquid crystal compound or composition (D) is preferably in the range of from 50 mol %:50 mol % to 99.9 mol %:0.1 mol %, more preferably from 65 mol %:35 mol % to 99 mol %:1 mol %, and even more preferably from 80 mol %:20 mol % to 95 mol %:5 mol %.

The TGBA-phase liquid crystal composition of the present invention may be a composition showing dual frequency addressing.

With the term "dual frequency addressing" in the present invention, it is meant that the liquid crystal composition has crossover frequency "fc" at which the dielectric anisotropy changes from positive to negative by increasing the frequency of applied voltage. Crossover frequency may be measured with a commercial dielectric constant measuring instrument (Solartron 1255B, 1296, manufactured by Toyo Technica Co.).

The dielectric anisotropy $\Delta\in$ of the liquid crystal composition having crossover frequency is changed from positive to negative by frequency, so this property may be utilized to change the direction of alignment. For other dual frequency addressable liquid crystal, reference may be made to Liquid Crystal Device Handbook, edited by Committee 142 of Japan Society for the Promotion of Science, Nikkan Kogyo Shimbun, 1989, pp. 189-192.

For allowing the liquid crystal composition of the present invention to demonstrate dual frequency addressing, the first nematic liquid crystal compound or composition may be allowed to exhibit dual frequency addressing or the cholesteric liquid crystal composition may be allowed to exhibit dual frequency addressing.

When the first nematic liquid crystal compound or composition exhibits dual frequency addressing, the first nematic liquid crystal compound or composition is preferably a compound or composition of the Formula (I) wherein the total number of groups presented by $D^1$ and $D^2$, that is, e×m+k, is 3 or 4, and the divalent linking group $L^1$ is an ester group (—COO—, —OCO—) or an alkyleneoxy group.

When the cholesteric liquid crystal composition exhibits dual frequency addressing, the cholesteric liquid crystal composition is preferably a composition of the Formula (II) wherein the total number of groups presented by $D^1$ and $D^2$, that is, e×m+k, is 3 or 4, and the divalent linking group $L^2$ is an ester group (—COO—, —OCO—) or an alkyleneoxy group.

When the TGBA-phase liquid crystal composition of the present invention contains a dichroic dye, the liquid crystal composition is made capable of color display, therefore, the liquid crystal composition in TGBA phase at room temperature preferably contains a dichroic dye. The dichroic dye is defined as a compound to be dissolved in a host liquid crystal to exhibit a function of absorbing light.

The maximum light-absorbing wavelength and light-absorbing band of the dichroic dye are not specifically limited, but the dichroic dye preferably have an absorption maximum in the yellow region (Y), magenta region (M), or cyan region (C).

In each TGBA-phase liquid crystal composition, dichroic dyes may be used alone or as a mixture of two or more thereof. When plural dyes are mixed, dichroic dyes of the same chromophore may be mixed, or dichroic dyes having chromophores different from one another may be mixed, and it is preferred to use a mixture of the dichroic dyes having absorption maximums in Y, M, and C regions, respectively.

Known dichroic dyes include those described in, for example, "Dichroic Dyes for Liquid Crystal Display" by A. V. Ivashchenko (CRC, 1994).

Methods of displaying a full color by mixing a yellow dye, a magenta dye and a cyan dye is specifically described in "Color Chemistry" (by Sumio Tokita, Maruzen Company, Limited, 1982). Here, the yellow region means in a range of 430 to 490 nm, the magenta region in a range of 500 to 580 nm, and the cyan region in a range of 600 to 700 nm.

Next, a chromophore to be used for the dichroic dye of the present invention will be described.

Any chromophoric group of the dichroic dye may be used, including, for example, azo dyes, anthraquinone dyes, perylene dyes, merocyanine dyes, azomethine dyes, phthaloperylene dyes, indigo dyes, azulene dyes, dioxadine dyes, polythiophene dyes, and phenoxadine dyes. Preferred are azo dyes, anthraquinone dies, phenoxazine dyes, and particularly preferred are anthraquinone dyes, or phenoxazone dyes (phenoxazine-3-one).

The azo dyes may be any of monoazo dyes, bisazo dyes, trisazo dyes, tetrakisazo dyes, and pentakisazo dyes, and preferred are monoazo dyes, bisazo dyes, trisazo dyes and the like.

The cyclic structure contained in the azo dye may be heterocyclic rings (quinone ring, pyridine ring, thiazole ring, benzothiazole ring, oxazole ring, benzooxazole ring, imidazole ring, benzohimdazole ring, pyrimidine ring, or the like) in addition to aromatic groups (benzene ring, naphthalene ring, or the like).

The substituent for the anthraquinone dye is preferably those containing an oxygen atom, sulfur atom, or nitrogen atom; and includes, for example, a alkoxy group, an aryloxy group, an alkylthio group, an arylthio group, an alkylamino group, and an alylamino group. The number of substitution of the substituent may be of any number and di-substitution, tri-substitution, or tetrakis-substitution is preferred, and di-substitution and tri-substitution are particularly preferred. The substitution of the substituent may be at any position and preferred structure is 1,4-di-substitution, 1,5-di-substitution, 1,4,5-tri-substitution, 1,2,4-tri-substitution, 1,2,5-tri-substituion, 1,2,4,5-tetra-substitution, and 1,2,5,6-tetra-substitution.

The substituent for the phenoxazone dye (phenaxazin-3-on) is preferably those containing an oxygen atom, sulfur atom, or nitrogen atom; and includes, for example, an alkoxy group, an aryloxy group, an alkylthio group, an arylthio group, an alkylamino group, and an arylamino group.

The ratio of the dichroic dye to the host liquid crystal in the liquid crystal composition of the present invention is not particularly limited because the absorbance index varies depending on the dye, but preferably the ratio of the dichroic dye is 0.1 to 15% by mass, more preferably 0.2 to 8% by mass. In the present invention, the host liquid crystal refers to the TGBA-phase liquid crystal composition of the present invention which exhibits a TGBA-phase at room temperature.

The dichroic dye of the present invention may be dissolved in the host liquid crystal by mechanical stirring, heating, sonication or any combination thereof. Additionally, known method may be employed for preparation of the liquid crystal composition of the present invention.

Now, the liquid crystal device of the present invention is described in detail. The liquid crystal device includes a pair of electrodes of which at least one is a transparent electrode, and a liquid crystal layer between the pair of the electrodes, wherein the liquid crystal layer comprises at least one liquid crystal composition described above. The form of the liquid crystal composition contained in the layer is not limited; for example, the layer may be a liquid crystal layer including the liquid crystal composition, or as described later, the liquid crystal composition may be incorporated into microcapsules or dispersed in polymers.

An electrode substrate used in the liquid crystal device of the present invention is usually a glass or plastic substrate, and a plastic substrate is preferable. The plastic substrate used in the present invention may be made of an acrylic resin, a polycarbonate resin, and an epoxy resin, for example triacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyester sulfone (PES), polyether imide (PEI), cyclic polyolefin, and polyimide (PI). A preferable polymer is polyethylene terephthalate (PET).

The thickness of the plastic substrate, though being not particularly limited, is preferably 30 μm to 700 μm, more preferably 40 μm to 200 μm, and even more preferably 50 μm to 150 μm. In any case, the haze is preferably 3% or lower, more preferably 2% or lower, and even more preferably 1% or lower, and the total light transmittance is preferably 70% or higher, more preferably 80% or higher, and even more preferably 90% or higher.

The plastic substrate may contain resin modifiers such as a plasticizer, a dye, a pigment, an antistatic agent, an ultraviolet absorbent, an antioxidant, inorganic fine particles, a separation promoting agent, a leveling agent and a lubricant if necessary in such a range that the effect of the present invention is not impaired.

The plastic substrate may be either light-transmissive or light non-transmissive. When a light non-transmissive substrate is used as the support, a light-reflective white support may be used. The white support may include, for example, a plastic substrate containing an inorganic pigment such as titanium oxide or zinc oxide. When the support constitutes a display surface, the support should have light transmittance of at least light in the visible range. The substrate is specifically described in, for example, pages 218 to 231 of Liquid Crystal Device Handbook, edited by Committee 142 of Japan Society for the Promotion of Science, Nikkan Kogyo Shimbunsha, 1989.

An electrode layer, preferably a transparent electrode layer, is formed on the surface of at least one substrate out of a pair of substrates. Indium oxide, indium tin oxide (ITO), tin oxide etc. are used in the transparent electrode layer. The transparent electrode used is the one described in, for example, pages 232 to 239 of Liquid Crystal Device Handbook, edited by Committee 142 of Japan Society for the Promotion of Science, Nikkan Kogyo Shimbunsha, 1989. The transparent electrode may be formed by a sputtering method, a sol-gel method, or a printing method.

For the purpose of aligning the liquid crystal in the liquid crystal device of the present invention, it is preferred to form a layer which is subjected to an alignment treatment on the surface at which the liquid crystal comes into contact with the substrate. The alignment treatment includes a method in which a quaternary ammonium salt is coated and aligned, a polyimide is coated and subjected to a rubbing treatment, SiOx is aligned by vapor-deposition in an oblique direction, and a light irradiation method by utilizing a photo-isomerization for alignment. Alignment film is described in, for example, pages 240 to 256 of Liquid Crystal Device Handbook, edited by Committee 142 of Japan Society for the Promotion of Science, Nikkan Kogyo Shimbunsha, 1989.

When the liquid crystal device of the present invention employs the dual frequency addressable smectic liquid crystal composition of the present invention as described above, the alignment of the liquid crystal may be switched with variation of applying voltage only, without an alignment layer. Thus, an alignment layer may or may not be present in the liquid crystal device of the present invention, and when an alignment layer is not present, there are advantages such as simplification of the structure, the prevention of the deterioration in display properties attributable to an alignment layer, etc.

In the liquid crystal device of the present invention, a pair of substrates are allowed to face each other with an space of 1 to 50 μm therebetween via a spacers or the like, and the liquid crystal composition of the present invention may be injected into the space. The spacer is described in, for example, pages 257 to 262 of Liquid Crystal Device Handbook, edited by Committee 142 of Japan Society for the Promotion of Science, Nikkan Kogyo Shimbunsha, 1989. The liquid crystal composition of the present invention may be disposed in the space between the substrates by applying or printing the liquid crystal composition onto the substrate.

The liquid crystal device of the present invention may further be provided with a white reflective plate, an antireflective coating, a brightness improving film, or the like.

The liquid crystal device of the present invention may be driven by a simple matrix driving system or an active matrix driving system using a thin film transistor (TFT) or the like. The driving system is described in, for example, pages 387 to 460 of Liquid Crystal Device Handbook, edited by Committee 142 of Japan Society for the Promotion of Science, Nikkan Kogyo Shimbunsha, 1989, which may be utilized as the driving system of the liquid crystal device of the present invention.

In the liquid crystal layer of the present invention, plural dichroic dyes may be mixed in one liquid crystal composition. The colors of the liquid crystal compositions may be any colors. For example, a black liquid crystal composition prepared by mixing plural dichroic dyes may be used for a liquid crystal display device for a monochromatic display by applying voltage.

Further, three liquid crystal compositions colored in red, green and blue respectively may be arrayed on or above a substrate to produce a liquid crystal device for color display.

In the liquid crystal layer in the present invention, the liquid crystal composition may be constituted as microcapsules as described in Japanese Patent Application Laid-Open (JP-A) No. 11-24090. Such microcapsules are those having a polymer resin as a wall material with the dichroic dye-containing TGBA-phase liquid crystal composition included in the wall material. For producing the microcapsules, arbitrary methods known in the art may be used.

The liquid crystal layer of the present invention may be a liquid polymer dispersed liquid crystal as described in JP-A-No. 5-61025, JP-A-No. 5-265053, JP-A-No. 6-3691, JP-A No. 6-23061, JP-A-No. 5-203940, JP-A-No. 6-242423, JP-A-No. 6-289376, JP-A-No. 8-278490 and JP-A-No. 9-813174.

The liquid polymer dispersed liquid crystal is roughly divided into a PDLC (liquid polymer dispersed liquid crystal) type wherein a liquid crystal with which air voids in a polymer material having independent air voids have been filled is in a discontinuous phase and a PNLC (polymer network liquid crystal) type wherein a liquid crystal with which air voids in a polymer material having continuous air voids have been filled is in a continuous phase, and either type may be used in the present invention. For producing the polymer dispersed liquid crystal, arbitrary methods known in the art may be used. The liquid crystal layer in the present invention may be constituted by laminating the polymer dispersed liquid crystal.

In the present invention, the TGBA phase liquid crystal composition which exhibits a TGBA phase at room temperature may be used widely in preparation of liquid crystal displays and suitably used particularly in light-scattering display materials and guest-host-mode liquid crystal display devices. PDLC display devices and guest-host-mode liquid crystal display devices prepared using the liquid crystal composition may display images of high display contrast ratio and has a memory function, and may thus be preferably used in a reflective display material or a light modulating material.

EXAMPLES

The present invention is described in more detail by reference to the Examples, but the present invention is not limited thereto.

Example 1

(Preparation of Cholesteric Liquid Crystal Composition 1)

A mixture of 98.6 mg of dual frequency addressing nematic liquid crystal (H-1) described in Applied Physics Letters, Vol. 25, 186 to 188 (1974) as the second nematic liquid crystal composition and 1.4 mg of a chiral reagent R-1011 (manufactured by Merck) was heated on a hot plate at 180° C. for 1 hour, then cooled to a room temperature, and left overnight to obtain a cholesteric liquid crystal composition 1.

(H-1)

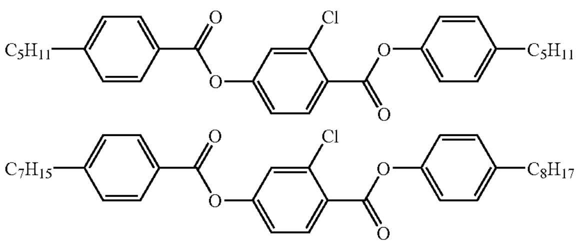

(1:1 mixture)

(Preparation of RT TGBA-Phase Liquid Crystal Composition 1)

A mixture of 90 mg of the cholesteric liquid crystal composition 1 and 10 mg of a first nematic liquid crystal compound below was heated on a hot plate at 180° C. for 1 hour, then cooled to a room temperature, and left overnight. The product thus obtained when observed under a polarization microscope exhibited a TGBA phase at room temperature.

When the temperature range in which the TGBA phase had been exhibited was measured by observation under a polarization microscope with a hot stage manufactured by INSTEC Ltd., it was revealed that the TGBA phase was exhibited in the range of from 15° C. (unmeasured at a temperature below 15° C.) to 41° C.

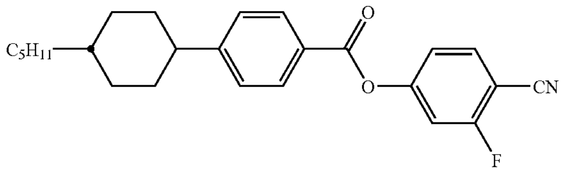

Example 2

(Measurement of Dye Absorption)

A dichroic dye was dissolved in the TGBA-phase liquid crystal composition 1 obtained in Example 1. Separately, a dichroic dye was dissolved in the second nematic liquid crystal composition H-1 as a comparative sample. By measurement of absorbance with a spectrophotometer (UV-2400PC manufactured by Shimadzu Corporation), the TGBA-phase liquid crystal composition showed absorbance 1.95 times as high as that of the comparative sample. From this result, it may be seen that the absorbance of the dye is improved by the helical structure periodic structure of the TGBA phase.

(Dual Frequency Addressing)

Upon application of a voltage of 100 V with different frequencies, the absorbance of the dye was decreased at 100 Hz, and subsequently at 10 kHz, the absorbance was increased. From this result, it may be seen that the liquid crystal composition exhibits dual frequency addressing.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A liquid crystal composition exhibiting a Twisted Grain Boundary Smectic A (TGBA) phase at room temperature, comprising at least one cholesteric liquid crystal composition and at least one first nematic liquid crystal compound or composition, wherein the cholesteric liquid crystal composition comprises at least one second nematic liquid crystal compound or composition and at least one chiral reagent, and wherein the first nematic liquid crystal compound is a compound represented by the following Formula (I):

$$T^1\text{-}((D^1)_e\text{-}(L^1)_f)_m\text{-}(D^2)_k\text{-}T^2 \quad \text{Formula (I);}$$

wherein $D^1$ and $D^2$ each independently represent an arylene group, a heteroarylene group or a divalent alicyclic hydrocarbon group; $L^1$ represents an azomethine group; $T^1$ represents an alkvl group or an alkoxy group; $T^2$ represents a cyano group, a halogen atom, a nitro group, a perfluoroalkoxy group or a perfluoroalkyl group; and e, f, m and k satisfy one of the following:

e=1, f=1, m=2, k=1; (i)

e=2, f=1, m=1, k=1; (ii)

e=2, f=2, m=1, k=1; (iii)

e=1, f=1, m=1, k=2; or (iv)

e=1, f=2, m=1, k=2; and (v)

wherein a ratio (A:B) of the second nematic liquid crystal compound or composition (A) to the chiral reagent (B) is from 85 mol %:15 mol % to 99.9 mol %:0.1 mol %.

2. The liquid crystal composition according to claim 1, wherein the TGBA phase at room temperature is induced by mixing the at least one cholesteric liquid crystal composition with the at least one first nematic liquid crystal compound or composition.

3. The liquid crystal composition according to claim 1, wherein the cholesteric liquid crystal composition is in a cholesteric phase at room temperature.

4. The liquid crystal composition according to claim 1, wherein the second nematic liquid crystal compound or composition comprises a compound having, in its molecule, an ester group, an azomethine group or an azoxy group.

5. The liquid crystal composition according to claim 1, wherein an HTP (Helical Twisting Power) value of the chiral reagent is 5 to 50.

6. The liquid crystal composition according to claim 1, wherein the ratio (A:B) of the second nematic liquid crystal compound or composition (A) to the chiral reagent (B)in the cholesteric liquid crystal composition is from 85 mol %:15 mol % to 99.5 mol %:0.5 mol %.

7. The liquid crystal composition according to claim 1, wherein a ratio (C:D) of the cholesteric liquid crystal composition (C) to the first nematic liquid crystal compound or composition (D) is from 65 mol %:35 mol % to 99 mol %:1 mol %.

8. The liquid crystal composition according to claim 1, wherein the second nematic liquid crystal compound is a compound represented by the following Formula (II):

$$T^1\text{-}((D^1)_e\text{-}(L^2)_f)_m\text{-}(D^2)_k\text{-}T^3 \quad \text{Formula (II);}$$

wherein $D^1$ and $D^2$ each independently represent an arylene group, a heteroarylene group or a divalent alicyclic hydrocarbon group; $L^2$ represents an ester group, an azomethine group or an azoxy group; $T^1$ represents an alkyl group or an alkoxy group; $T^3$ represents an alkyl group, an alkoxy group or a halogen atom; e, f, m and k satisfy one of the following:

c=1, f=1, m=2, k=1; (i)

c=1, f=0, m=2, k=1; (ii)

when $T^3$ of Formula (II) is a halogen atom, $T^2$ of Formula (I) is not a halogen atom; and when $T^2$ of Formula (I) is a halogen atom, $T^3$ of Formula (II) is not a halogen atom.

9. The liquid crystal composition according to claim 1, which exhibits dual frequency addressing.

10. The liquid crystal composition according to claim 1, wherein the first nematic liquid crystal compound exhibits dual frequency addressing, and in the Formula (I), e×m+k is 3 or 4.

11. The liquid crystal composition according to claim 8, wherein the cholesteric liquid crystal composition exhibits dual frequency addressing, and in the Formula (II), e×m+k is 3 or 4, and $L^2$ is (—COO— or —OCO—).

12. The liquid crystal composition according to claim 1, further comprising at least one dichroic dye.

13. A liquid crystal device having a pair of electrodes of which at least one is a transparent electrode, and a liquid crystal layer between the pair of the electrodes, wherein the liquid crystal layer comprises at least one liquid crystal composition according to claim 1.

14. A reflective display material comprising the liquid crystal device according to claim 13.

15. A light modulating material comprising the liquid crystal device according to claim 13.

16. The liquid crystal composition according to claim 1, wherein e, f, m and k in Formula (I) satisfy one of the following:

e=1, f=1, m=2, k=1; (i)

e=2, f=1, m=1, k=1; or (ii)

e=1, f=1, m=1, k=2. (iv)

17. The liquid crystal composition according to claim 1, wherein $D^2$ is substituted with an electron-withdrawing group, and wherein the position of said electron-withdrawing group is the ortho-position relative to $T^2$.

* * * * *